Patented Aug. 26, 1952

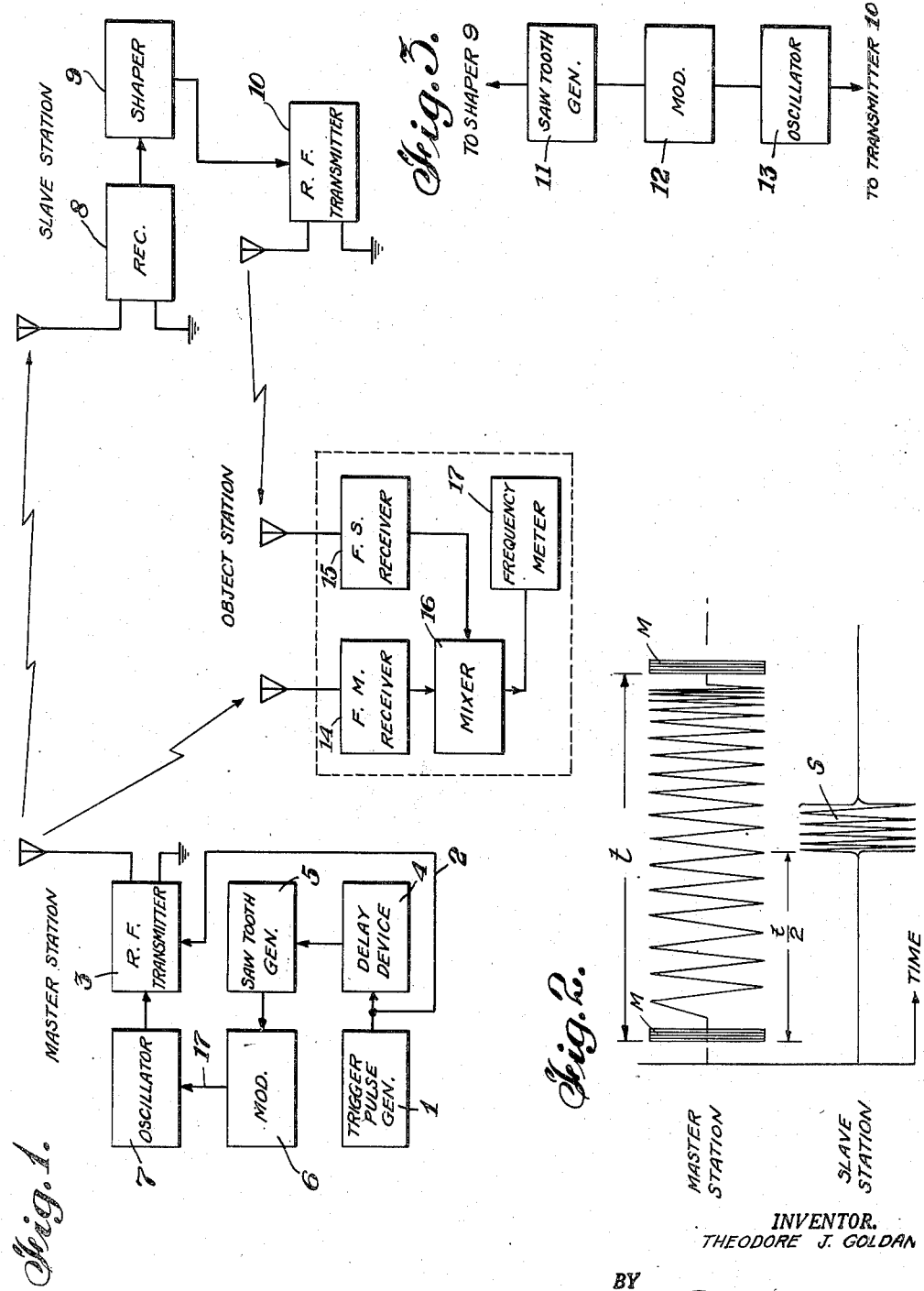

2,608,684

UNITED STATES PATENT OFFICE 2,608,684

RADIO NAVIGATION SYSTEM

Theodore J. Goldan, New York, N. Y., assignor to Federal Telephone and Radio Corporation, New York, N. Y., a corporation of Delaware Application March 29, 1947, Serial No. 738,034

12 Claims. (Cl. 343—104)

This invention relates to a radio navigation system providing means for locating the position of an object station with reference to two fixed stations and particularly to systems wherein the object station translates related radiant energy signals transmitted by the fixed stations as distinguished from mere bearing determination.

In the previous systems of this type, radiant energy standing wave patterns are usually established between the two fixed stations. A receiver located in an object station, as for example a mobile vehicle or aircraft, is tuned to the frequency of transmission and detects the pattern minimum and maximum, and through suitable amplifier and relays actuates a mechanical counter to show accumulated distance. Other systems usually provide means for measuring the time arrival of signal pulses received from several fixed stations; the transmission of the pulses from the fixed stations usually being synchronized in a predetermined manner. However, these systems have usually required elaborate measuring apparatus such as oscillographs for measuring discrete quantities, or else the quality of the measurements is variable and not precise enough.

An object of the present invention is to provide an improved radio navigation system.

Another object of this invention is to provide an improved method of signal transmission from fixed stations for determining the position of an object.

Another object of the invention is to provide new and improved methods and apparatus for determining the location of objects with a single and inexpensive device, particularly objects having an electromagnetic receiver.

In accordance with the present invention two stations are provided at fixed positions along a given course, which transmit electrical signals having varying characteristics in synchronism or as by providing control by one station over the others and means are provided at an object or moving station located along this course for translating the variable characteristic electrical signals arriving simultaneously thereat from said fixed stations, and thereby actuate a simple indicator for indicating the position of the object with respect to the fixed stations.

The above mentioned and other features of this invention will become more apparent, and the invention itself, though not necessarily defined by said features and objects, will be best understood by reference to the following description of an embodiment of the invention taken in connection with the accompanying drawings, wherein Fig. 1 shows in block diagram form a radio navigation system embodying the present invention;

Fig. 2 shows schematically an arrangement of wave shapes as applied in the present invention.

Fig. 3 shows in block diagram form a preferred modification of the system shown in Figure 1 wherein both stations transmit frequency modulated waves.

In Fig.1 a master transmitting station is shown comprising a pulse generator 1, having a pulse recurrence frequency substantially twice the time it takes a radiant energy wave to travel from the master to a slave station. Challenging pulses from generator 1 are applied through connection 2 to radiant energy transmitter 3 for transmission to the slave station. Simultaneously the pulses from generator 1 are delayed in a delay line 4 for a period sufficient to permit the trigger pulse to reach the slave station coincident with the beginning of the slave station response transmission. The delayed pulses are next passed to the circuit 5 for producing saw tooth waves having a duration corresponding to the remaining time interval before the next challenging pulse. The saw tooth signal is then applied through reactance modulator 6 to the oscillator circuit 7 for producing frequency modulated signals of increasing frequency as the saw tooth voltage increases along its sloping edge. This increase of frequency signal is then passed to transmitter 3 and transmitted to the slave station. Thus from the time immediately after the transmission of the challenging pulse from generator 1 there is transmitted from the master station a wave modulated with a gradually increasing frequency until the pulse originally transmitted from the master station travels to the slave station and back again to the master station, at which time another pulse is transmitted and the cycle is repeated continuously.

It is desirable, but not necessary, that the transmitter antennae for the master and slave stations be directive toward each other, both for economy in power and in order that an object station will better know when it is on the fixed path between the master and slave stations.

The slave station is adapted to receive the challenging pulses transmitted from the master station on a frequency FM in the receiver 8. Selected pulses may then be passed, if desired, through a shaping circuit 9 to improve their shape, and thence to a transmitter 10 operating on a frequency FS different from that FM of transmitter 3.

Wave forms showing these signals are illustrated in Figure 2. The signals from the master station comprise a main pulse M which is the one transmitted from generator 1 through line 2 directly to transmitter 3, followed by a frequency modulated wave which gradually increases in frequency until just before the pulse M is again transmitted. Starting at one half the time period between the main pulses are the pulses transmitted from the slave station S, which gradually decreases in frequency during its duration as described hereafter.

Furthermore, if the pulses show substantial duration it may be desirable to insert in the circuit between shaper 9 and the transmitter 10, the circuit of Figure 3. The signals from 9 are then passed through a saw-tooth generator 11, a reactance modulator 12 to the signal oscillator 13, similar to the corresponding circuit of the master station, but operating in such a manner as to produce gradually decreasing frequency signals modulated on the single FS carrier.

Furthermore, if found desirable the carrier may be modulated with a separate amplitude or frequency modulated wave varying in frequency with time. Such is an obvious modification of the circuit previously described.

Referring now to the object station, this includes means for receiving the above described transmission and may comprise separate receivers 14 and 15 tuned to frequencies of FM and FS respectively. The outputs of receivers 14 and 15 are combined in a mixer circuit 16 which is so arranged as to be normally blocked, and triggered only when signals are received simultaneously from both receivers. The combined frequencies in the output of the mixer are then measured in a suitable frequency meter 17 (which may be of the "Weston" type) and which may be calibrated to give a direct indication of the distance in miles of the object station from the fixed stations. Thus an indication is obtained corresponding to the instantaneous pulses of frequency received when the pulse from the slave station coincides with a given frequency position along the frequency modulated wave transmitted from the master station. A preferable way of selecting those times when both signals are simultaneously received by the object station is to provide in the output of the mixer circuit 16 a tuned circuit which passes only frequencies greater than the lowest sum-frequencies of the two modulated signals corresponding to the transmission of the master and slave stations. If the frequencies, which are passed through such a filter after the mixer circuit 16 are inconveniently high, they may be passed into another detector stage or intermediate frequency stage before being passed to the frequency meter 17. If radio or intermediate frequencies are used all the way through the circuit at the object station, the frequency meter could be replaced by a discriminator for more efficient operation at the higher frequencies.

Accordingly, regardless of the position of the object station, the receiver 14 tuned to the frequency FM will receive the entire train of frequencies transmitted by the master station. However, the output of the mixer will be stopped until such time as the pulse from the slave station is received and its frequency added to the frequency received coincidentally from the master station. At that time, the summation frequency will be a function of the elapsed time from the transmission of the main pulse from the master station, and the time of its reception at the object station, and consequently a function of the distance between the master station and the object station. The frequency meter 17, therefore, indicates increasing distance from the master station directly with increased frequency.

While I have described above the principles of my invention in connection with specific apparatus, and particular modifications thereof it is to be clearly understood that this description is made only by way of example and not as a limitation on the scope of my invention.

I claim:

1. In a radio navigation system, means for determining the location of an object station along a path approximately determined by two relatively fixed stations comprising means at one of said fixed stations to transmit a pulse for time reference, and at a predetermined time thereafter to transmit signals having a frequency characteristic varying in a given direction, means at the second of said fixed stations, responsive to the receipt of said transmitted pulse to transmit substantially at the end of said predetermined time signals having a frequency characteristic varying oppositely to that of the first said signals, means on said object station to receive said signals and combine them upon coincidental arrival to produce a resultant of their characteristics proportional to the lapse of time after said time reference point and means to indicate said resultant in terms of distance.

2. A radio navigation system comprising means for determining the location of an object station with respect to a master and slave station, said master station comprising means for transmitting a trigger pulse, means for transmitting said trigger pulse to said slave station, means for delaying said trigger pulse for a predetermined time interval, means responsive to said delayed pulse for producing signals of varying frequency characteristic, means for transmitting said varying characteristic signals to said object station, said slave station comprising means for receiving said trigger pulse, means for transmitting a response pulse of a given frequency characteristic to said object station, said object station comprising means for receiving said varying and said given characteristic signals, means responsive to the simultaneous arrival at said object station of said last named signals for producing a resultant characteristic, and means for translating said resultant characteristic for indicating the location of said object station.

3. A radio navigation system for determining the location of an object station with respect to a master and slave station, said master station comprising means for producing a trigger pulse to actuate said slave station and means for transmitting at a predetermined time interval after the transmission of said trigger pulse continuous radiant energy signals of varying frequency characteristic, said slave station comprising means for transmitting a single pulse signal of radiant energy of a given frequency characteristic upon the reception of said trigger pulse, said object station comprising means for receiving said characteristic signals, means for demodulating said last named signals received simultaneously by said receiving means, means for applying said demodulated signals to an indicator, said indicator comprising means for translating said demodulated signals for indicating said object station position.

4. A radio navigation system comprising means for determining the position of an object station with respect to a master and slave station, said master station comprising means for transmitting a trigger pulse, means for transmitting said trigger pulse to said slave station, means for delaying said trigger pulse for a predetermined time interval, means responsive to said delayed pulse for producing signals frequency modulated in a given direction and of a given duration, means for transmitting said frequency modulated signals, said slave station comprising means for receiving said trigger pulse, means for transmitting a response signal of a given duration, said object station comprising means for receiving said frequency modulated signals and said response signal, means responsive to the simultaneous arrival at said object station of said frequency modulated signals and said response signal for translating said received signals, an indicator responsive to said translated signals for indicating the position of said object station.

5. A radio navigation system comprising means for determining the position of an object station with respect to a master and slave station, said master station comprising means for transmitting trigger pulses having a predetermined pulse recurrent frequency, means for delaying said trigger pulses for a predetermined time interval, means responsive to said delayed pulses for producing frequency modulated signals of increasing frequency and of a duration dependent upon the time interval between trigger pulses, and means for transmitting said frequency modulated signals, said slave station comprising means for receiving said trigger pulses, and means for transmitting a response pulse of a given duration, said object station comprising means for receiving said frequency modulated signal and said response pulse, means responsive to the simultaneous reception of said frequency modulated signals and said response pulse for translating said received energy, an indicator responsive to said translated energy for indicating the position of said object station.

6. A radio navigation system for determining the location of an object station with respect to a master and slave station, said master station comprising means for producing a trigger pulse to actuate said slave station followed by frequency modulated radiant energy signals, said slave station comprising means for transmitting a response signal of predetermined duration upon the reception of said trigger pulse, said object station comprising means for receiving said frequency modulated signals and said response signal, means for demodulating said last named frequency modulated and response signals received simultaneously by said receiving means, means for applying said demodulated signals to an indicator, said indicator comprising means for translating said demodulated signals for indicating said object station location.

7. A radio navigation system for determining the location of an object station with respect to a master and slave station, said master station comprising means for producing a trigger pulse to actuate said slave station and means for transmitting at a predetermined time interval after the transmission of said trigger pulse radiant energy signals frequency modulated in a given direction, said slave station comprising means for transmitting a single pulse of radiant energy of a given frequency upon the reception of said trigger pulse, said object station comprising means for receiving said frequency modulated signals and said given frequency pulse, means for demodulating said last named signals and pulses received simultaneously by said receiving means, means for applying said demodulated energy to an indicator, said indicator comprising means for translating said demodulated energy for indicating said object station location.

8. A radio navigation system for determining the position of an object station with respect to a master and slave station, said master station comprising a pulse generator, a radiant energy transmitter, a delay circuit, a saw-tooth wave generator, means for applying generated pulses to said transmitter for transmitting a trigger pulse to said slave station, means for applying said pulse to said delay circuit for delaying said pulse for a predetermined time interval, means for applying said delayed pulse for a predetermined time interval, means for applying said delayed pulse to said saw-tooth generator for producing a saw-tooth wave of a given duration, a signal oscillator, means comprising a reactance modulator for applying said saw-tooth wave to said signal oscillator whereby frequency modulated waves of increasing frequency corresponding to the amplitude of said saw-tooth wave are produced, means for transmitting said frequency modulated waves, said slave station comprising means for receiving said trigger pulse, means for shaping said pulse, means responsive to said shaped pulse for transmitting a given pulse, said object station comprising separate receivers for receiving said given frequency pulse and said frequency modulated waves, means for combining the energy of said received pulse and waves comprising a mixer circuit responsive only to said received energy when received simultaneously by said separate receivers, means responsive to said combined energy for translating said last named energy and for providing an indication of the position of said object station.

9. A radio navigation system for determining the position of an object station with respect to a master and slave station, said master station comprising a pulse generator, for producing pulses of a given pulse recurrence frequency, a radiant energy transmitter, a delay circuit, means for applying said pulses to said transmitter for transmitting a trigger pulse to said slave station, means for applying said pulse to said delay circuit for delaying said pulse for a time interval, sufficient to permit the trigger pulse to reach the slave station, means responsive to said delayed pulse for producing a saw-tooth wave of a period corresponding to the remaining time interval before the succeeding trigger pulse a signal oscillator, means including a reactance modulator for applying said saw-tooth wave a reactance modulator to said signal oscillator whereby frequency modulated waves of increasing frequency corresponding to the amplitude of said saw-tooth wave are produced, means for transmitting said frequency modulated waves, said slave station comprising means for receiving said trigger pulse, means for shaping said pulse, means responsive to said shaped pulse for transmitting pulse of given frequency said object station comprising separate receivers for receiving said given frequency pulse and said frequency modulated waves, means for combining said last named signals comprising a mixer circuit responsive only to said signals or received simultaneously by said separate receivers an inductor means for applying said combined signals including the sum frequency of said last named received signals to said indicator, said indicator comprising means for translating said last named signals for providing an indication of the location of said object station.

10. A radio navigation system for determining the location of an object station with respect to a master and slave station, said master station comprising a pulse generator, a radiant energy transmitter, a delay circuit, means for applying said pulses to said transmitter for transmitting a trigger pulse to said slave station, means for applying said pulse to said delay circuit for delaying said pulse for a predetermined time interval, means responsive to said delayed pulse for producing a saw-tooth wave of a given period, a signal oscillator, means including a reactance modulator for applying said saw-tooth wave to said signal oscillator whereby frequency modulated signals of increasing frequency corresponding to the amplitude of said saw-tooth wave are produced, means for transmitting said frequency modulated signals, said slave station comprising means for receiving said trigger pulse, means for shaping said pulse, means responsive to said shaped pulse for producing and transmitting a given signal, said object station comprising a receiver for receiving said given signal and said frequency modulated signals, means for combining said received signals comprising a mixer circuit responsive only to said signals or received simultaneously by said receiver or indicator, and means for applying said combined signals to said indicator, said indicator comprising means for translating said last named signals for providing an indication of the location of said object station.

11. A radio navigation system for determining the position of an object station with respect to a master and slave station, said master station comprising means for producing a trigger pulse to actuate said slave station and means for transmitting at a predetermined time interval after the transmission of said trigger pulse frequency modulated radiant energy signals, said slave station comprising means for transmitting a response signal of predetermined characteristic different from said frequency modulated signals upon the reception of said trigger pulse, said object station comprising means for receiving said frequency modulated signals and said response signal, means for demodulating said last named signals as received simultaneously by said receiving means, to obtain a resultant characteristic means responsive to said demodulated signals for translating said demodulated signals and for indicating said object station position.

12. A system as set forth in claim 10 wherein said shaped pulse responsive producing means comprises means for producing a saw-tooth wave of a predetermined duration means for applying said last named saw-tooth wave through a reactance modulator to a signal oscillator circuit whereby frequency modulated signals of decreasing frequency corresponding to the amplitude of said last named saw-tooth wave are produced, means for transmitting said last named frequency modulated signals.

THEODORE J. GOLDAN.

REFERENCES CITED

The following references are of record in the file of this patent:

UNITED STATES PATENTS

| Number | Name | Date |
|---|---|---|
| 2,419,525 | Alford | Apr. 29, 1947 |
| 2,420,516 | Bischoff | May 13, 1947 |
| 2,421,017 | Deloraine | May 27, 1947 |
| 2,427,219 | Luck | Sept. 9, 1947 |
| 2,431,305 | Chatterjea | Nov. 25, 1947 |

FOREIGN PATENTS

| Number | Country | Date |
|---|---|---|
| 672,104 | Germany | Feb. 22, 1939 |